W. A. HICKS.
SEED PLANTER.
APPLICATION FILED MAR. 21, 1918.
1,280,468.
Patented Oct. 1, 1918.
3 SHEETS—SHEET 1.
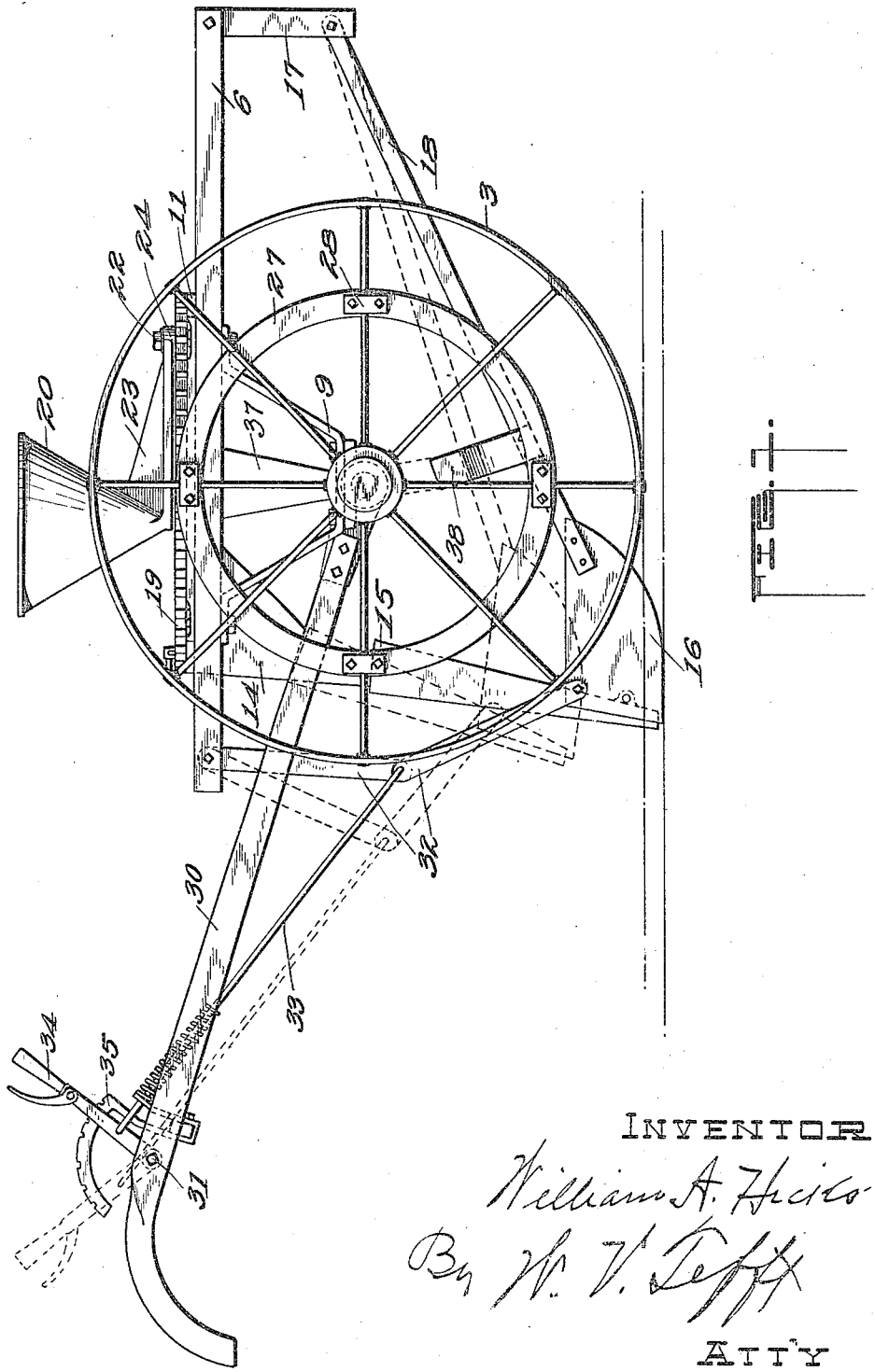
INVENTOR.
William A. Hicks
By W. V. Tefft
ATT'Y

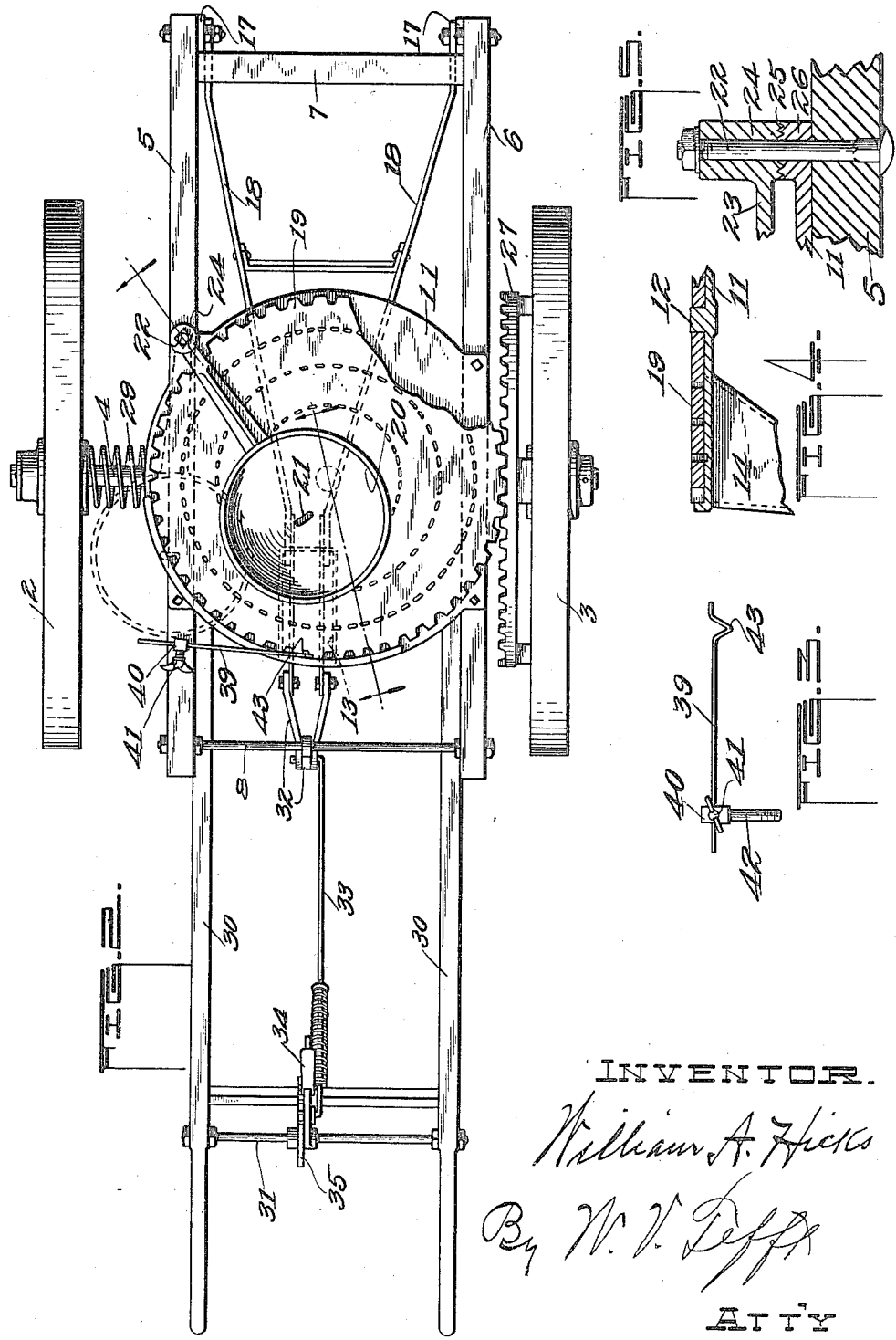

W. A. HICKS.
SEED PLANTER.
APPLICATION FILED MAR. 21, 1918.
1,280,468.
Patented Oct. 1, 1918.
3 SHEETS—SHEET 3.
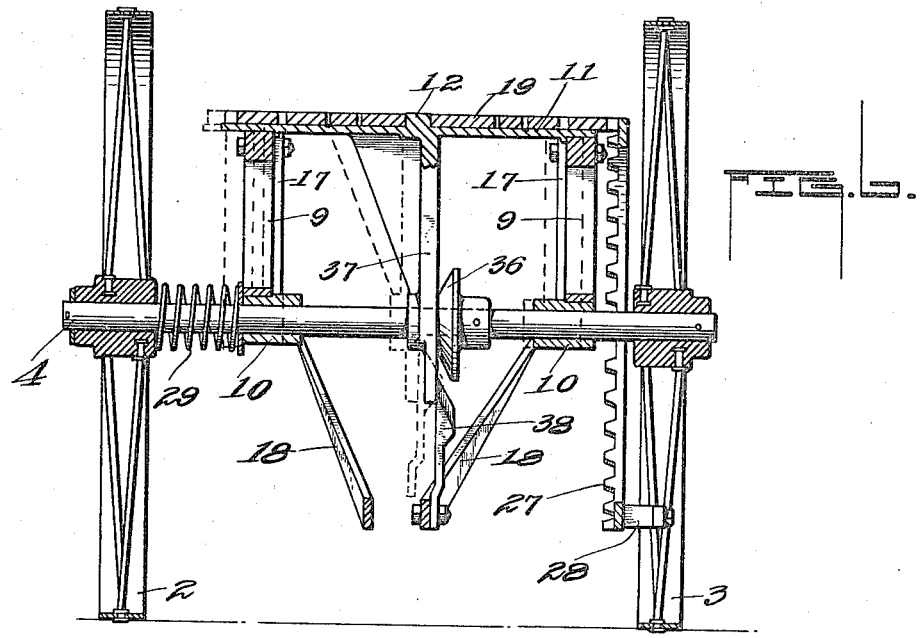
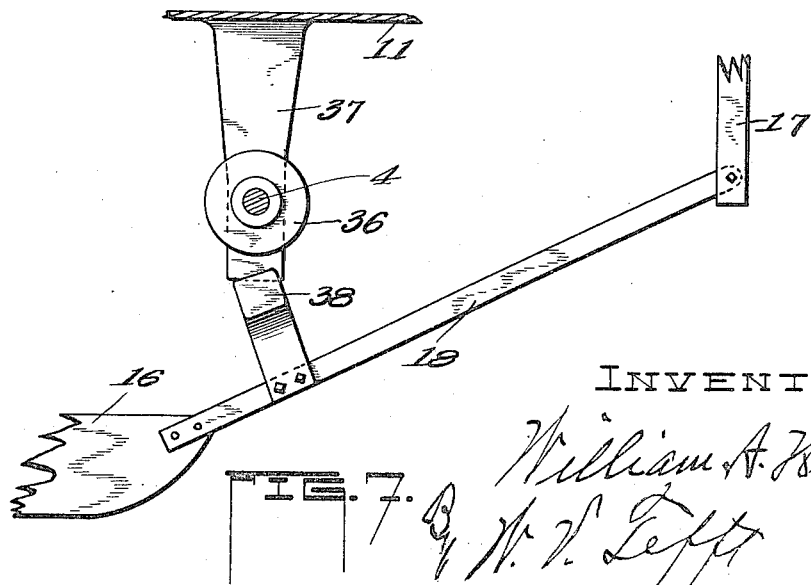
INVENTOR.
William A. Hicks
W. V. Tefft
ATT'Y

UNITED STATES PATENT OFFICE.

WILLIAM A. HICKS, OF CHILLICOTHE, ILLINOIS.

SEED-PLANTER.

1,280,468.    Specification of Letters Patent.    Patented Oct. 1, 1918.

Application filed March 21, 1918. Serial No. 223,693.

*To all whom it may concern:*

Be it known that I, WILLIAM A. HICKS, a citizen of the United States, residing at Chillicothe, in the county of Peoria and State of Illinois, have invented certain new and useful Improvements in Seed-Planters, of which the following is a specification.

My invention relates to seed planters.

More particularly my invention relates to a planter designed especially for planting garden seed.

The object of my invention is to provide a planter that will freely distribute seed by the automatic action of the planter parts through a suitable timing of delivery of seeds, graduation of the same and conjunctive appliance adapted to fix delivery and prevent clogging.

Also my invention contemplates adjustability of parts relatively to facilitate the handling and proper planting of a great variety of garden seeds.

My invention consists in the application to a transportable structure, a container for seed, a seed disk, operative in connection with said seed hopper and capable of relative adjustment to accommodate a placement of the hopper relative to seed disk, that plural sets of seed delivery openings may be caused to register with the hopper to facilitate general use for seed planting.

My invention also involves the character of the disk and special means for driving same from movable part or parts of the portable vehicle, and also includes seed forcing means; means for adjusting the hopper with relation to the said disk; means for adjusting and placing the necessary parts of the vehicle that are serviceable in connection with the planting of the seed and to details hereinafter more particularly pointed out.

Referring to drawings—Figure 1 is a side elevation of the seeding machine. Fig. 2 is a plan view of the same with parts broken away to better illustrate details of structure. Fig. 3 is a detail view of a seed forcing member. Fig. 4 is a vertical sectional view partly broken away showing the manner of relating a seed plate to a support and of a connected chute. Fig. 5 is a detail sectional view with parts broken away to illustrate the manner of pivoting a hopper with relation to the machine. Fig. 6 is a vertical sectional view of the body of the machine. Fig. 7 is a detail view showing the relation of a movable member to the axle of the machine and a cam member thereon.

Referring to the drawings—2 and 3 are vehicle wheels. 4 is an axle; wheel 3 is designed to be fixed with relation to axle 4 and wheel 4 is designed to turn freely on the axle.

5 and 6 are framing members, 7 is a front cross member and 8 is a spacing rod at the rear of the frame. 9 are bracket members secured to the frame and are attached also to the sleeve member 10 on axle 4. Any suitable draft member may be attached to the frame. The frame above referred to is designed to be movable lengthwise of shaft 4 for purposes hereinafter described.

Upon the framing members 5 and 6 is mounted a plate 11 provided with a central stud 12, said plate being provided with an opening 13 (indicated by dotted line in Fig. 2). About this opening is attached a chute 14 which depends therefrom and is intended to deliver seed to a shank 15 of shoe 16. Shoe 16 is connected in a pivotal manner with depending members as 17 by means of bars 18 and is designed to be raised and lowered.

On the top of plate 11 is mounted a seed plate 19 provided with a central opening registering with stud 12 on the supporting plate and is designed to turn thereabout. Plate 19 is provided with notches about its periphery and with a series of rows of perforations between its center and periphery, the perforations in each row being of different sizes to accommodate planting seed of various size and quantity. The rows of perforations are ranged with reference to chute 14 so that each of said rows lies within the path of such opening and as the seed disk is revolved the particular perforations of each row will, at a certain time, be carried over said opening.

For the purpose of delivering seed to the seed disk, I have provided the hopper 20 which has an opening in its bottom portion as at 21 (see Fig. 2) and is connected with a pivoting bolt member 22 by means of an integral arm 23, the latter being provided with a sleeve member 24 engaging said pivot bolt and provided with a clutch face 25 which is adapted to engage a similar clutch face member as 26 on supporting plate 11. By means of this manner of mounting of hopper 20 the latter may be swung about the pivot bolt 22 into different positions with reference to the surface of the seed plate to accommodate the registering of opening 21 in said hopper with the various rows of perforations in said seed plate, and this adjustment may be readily accomplished by loosening the nut on bolt 22 and it may be fixed in any desired position for registering with the different sets of openings by means of the clutch engaging parts 25 and 26 and thereby be held firmly in place.

I have provided means for turning the seed plate comprising a tooth wheel 27 fixed to wheel 3 by means of suitable clamps as 28. The teeth of this wheel are spaced relatively and with relation to the peripheral notches in the seed plate and so arranged relative to said plate, that as said tooth wheel is revolved, it will cause the seed plate to be similarly revolved on its support 11, thus carrying the succeeding perforations in each series successively in register with the opening into chute 14 for the purpose of depositing seed carried within such openings to be discharged into said chute. It will be understood, of course, that seed will be delivered only to one set of openings at a time. The selection for such delivery of seed being made by the setting of the hopper for registering with whichever of the series of openings that may be desired.

Normally it is desired that the tooth wheel 27 and the seed plate 19 shall be in engagement through their tooth and notch members respectively. I accomplish this normal engagement by the interposition of the coil spring 29 between one of the supporting sleeves 10 of the frame and the hub of wheel 2. In the relation of such normal engagement, the machine will be operated to plant seed. However, I have provided means for releasing the driving connection between wheel 27 and seed plate 19, and for raising the planter shoe to facilitate transportation of the machine from place to place for turning at the ends of the rows, etc.

Referring to the means for rendering the machine inoperative, I have provided the rearwardly extending handle bars 30, the same being spaced apart as shown in Fig. 2 and connected at the forward ends with the sleeve members 10 on the axle 4, and connected at their rear end by spacing rod 31. These handle bars may be used for balancing and guiding the machine. The shoe 16 is connected with the frame of the machine by means of toggle bars 32, said bars being pivoted respectively to the shoe and the frame and together by means of reach 33, said reach extending rearwardly is connected with a pivoted ratchet lever 34 said ratchet lever working in connection with the ratchet rack 35, said ratchet lever and rack being both mounted upon, and in connection with, spacing rod 31. By moving the ratchet lever rearwardly, the shoe will be raised from the ground and by pushing it forwardly, it will be caused to enter the ground.

The particular means I have provided to cause the frame to be shifted upon axle 4 comprises a disk 36 fixed to axle 4 provided with a cam face. This disk lies adjacent a depending member 37 from plate 11 and normally in abutment thereagainst. A wedging member 38 is secured to one of the bars 18 and is movable therewith so that when the ratchet lever 34 is operated to raise the shoe, bar 18 will be raised and will cause the wedging member 38 to be thrust between the cam face of disk 36 and the depending member 37 which will serve to move the frame toward wheel 2 under the compression of spring 29 and will cause the tooth members of wheel 37 to disengage from the notches in seed plate 19, thereby throwing the machine out of operation.

The machine as above described, will under ordinary circumstances operate successfully, but to insure the delivery or dislodgment of seed from perforations in the seed disk, I have provided spring arm 39 adjustably supported in set head 40 that it may be extended or withdrawn to effect different reaches for registry with the different sets of openings as particular openings of each set are in register with the opening from the hopper into the chute 14. The spring rod is set and held by means of thumb nut 41 carried in set head 40. Set head 40 is connected with a pivot bolt 42 (see Fig. 3) which is suitably connected with and supported from the frame and may be turned with reference to said frame to facilitate the operation of spring rod 39. Spring rod 39 is provided with a plunger member 43 which in this instance is formed by bending the spring rod into substantially V form near to its outer end. As the seed disk is revolved and the spring arm is set for registry with one or another of said sets of seed perforations, it will bear upon the face of the seed disk and as the openings are reached, the plunger portion 43 thereof will descend into such opening and aid in expelling seed therefrom.

I have shown herein and described one form of embodiment of my invention for the purpose of exemplifying its uses and purposes, however, its parts may be materially modified, formed, re-arranged, and generally differentiated from the particular parts and combinations of parts without departing from the spirit of my invention, and I therefore, desire to extend my claims to the full extent of novelty presented.

What I claim is:

1. In a seed planter, in combination, a suitable tractable support including a pair of wheels and an axle, a frame supported on the axle, a supporting plate thereon provided with an elongated opening spaced between its center and outer edge, a chute registering with and depending from said opening, a seed plate supported and revoluble on said supporting plate provided with plural rows of seed openings between its axis and periphery, means for driving seed plate from the tractable support for the frame and for interrupting such driving connection, a hopper provided with a discharge opening therein registrable at the will of the operator with either of said plural rows of seed openings in the seed plate, and means for supporting said hopper to facilitate its being moved into register with either of said plural rows of seed openings and for fixing the same in such registry.

2. In a seeding machine, in combination, a supporting axle with wheels thereon, a frame supported on the axle in a relation adjustable lengthwise of the latter, a plate supported upon the frame provided with an opening therein, a depending chute communicating with the opening in the plate, a seed plate on the supporting plate provided with peripheral notches therein, a toothed member fixed to one of the wheels normally engageable with the notches in the seed plate, means for moving the frame on the axle support for causing disengagement of said driving connection between the toothed wheel and the seed plate, a hopper provided with a discharge opening, and means for supporting the hopper to permit it to be moved into different positions relative to the face of the seed plate.

3. In a seed planter, in combination, a vehicle axle provided with one loose and one fixed wheel thereon, a frame supported upon said axle in a relation to be movable lengthwise thereof, a spring spaced between the loose wheel and a member forming part of the frame, a supporting plate on the frame provided with an opening therein, a chute depending from said opening, a toothed member on the wheel which is fixed to the axle, a seed plate provided with peripheral notches normally engageable with the toothed member, and with seed openings therein, means for moving the frame lengthwise of the axle to effect disengagement between the toothed member and the seed plate, and a seed hopper provided with a discharge opening therein and registrable with the seed openings in the plate.

4. In a seed planter, in combination, a vehicle axle, wheels thereon, a frame supported upon said axle in a relation to be movable lengthwise thereof, a spring spaced between a portion of said frame and one of said wheels, a toothed member on one of said wheels, a seed plate supported on the frame engageable at times with said toothed member, and provided with seed openings therein, means for moving the frame lengthwise of the axle to effect disengagement between the toothed member and the seed plate, a hopper provided with a discharge opening therein, and registrable with the seed openings in the seed plate, and a spring arm plunger member having drag contact relation with the face of the seed plate and engageable with the seed openings therein for forcing seed from the openings in said seed plate as the latter is turned.

5. In a seed planter, in combination, a vehicle axle, wheels thereon, a sleeve on the axle movable lengthwise thereof, a frame supported upon the sleeve, including a plate member adapted to support a seed plate, the same being provided with an opening therein, a seed plate upon the supporting plate provided with seed openings therein, a hopper for registry with said seed openings, a driving member for the seed plate operable through the turning of one of the wheel members, means operable through the shifting of the sleeve member to effect engagement or disengagement between the driving member and the seed plate, and means for shifting the sleeve member lengthwise of its axle support.

In testimony whereof I affix my signature in presence of two witnesses.

WM. A. HICKS.

Witnesses:
 EVA McCREADY,
 THOMAS L. O'HERN.

Copies of this patent may be obtained for five cents each, by addressing the "Commissioner of Patents, Washington, D. C."